Aug. 3, 1926.

W. CUSHING ET AL 1,595,044

HEADLIGHT FOR AUTOMOBILES

Filed March 23, 1925

Inventors
Wade Cushing
Philip W. Kendall
By Wood & Wood Attorneys

Aug. 3, 1926.  
W. CUSHING ET AL  
HEADLIGHT FOR AUTOMOBILES  
Filed March 23, 1925
1,595,044
2 Sheets-Sheet 2
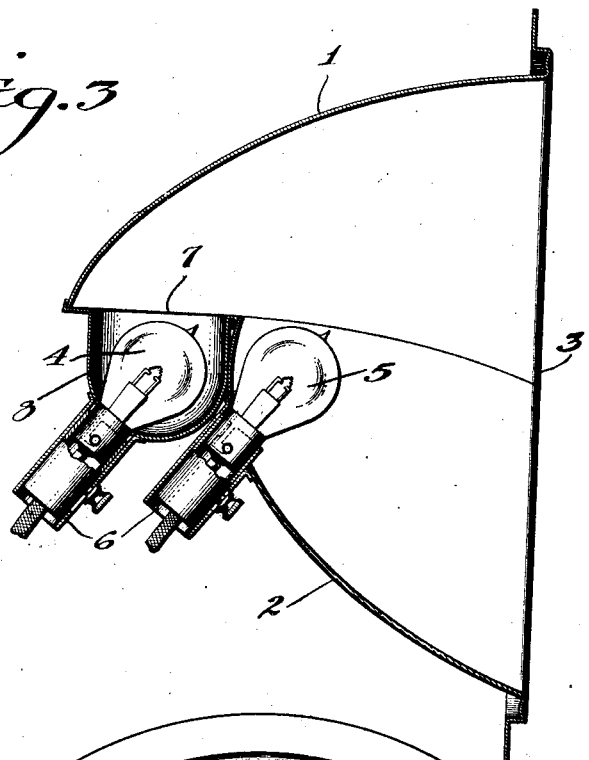
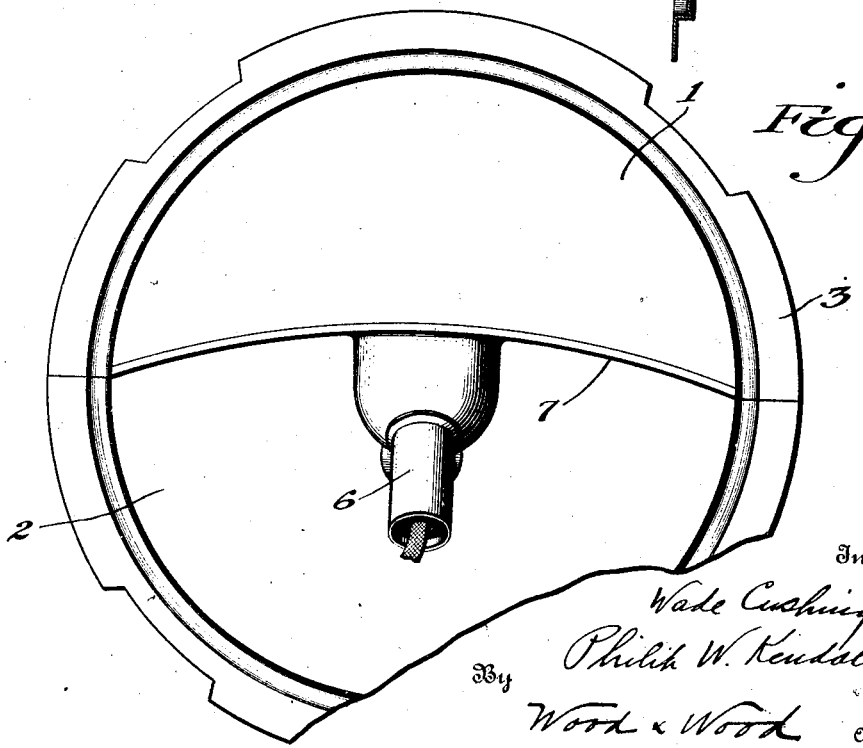
Inventors  
Wade Cushing  
Philip W. Kendall  
By Wood & Wood  
Attorneys Patented Aug. 3, 1926.

1,595,044

UNITED STATES PATENT OFFICE.

WADE CUSHING AND PHILIP W. KENDALL, OF CINCINNATI, OHIO; SAID KENDALL ASSIGNOR TO SAID CUSHING.

HEADLIGHT FOR AUTOMOBILES.

Application filed March 23, 1925. Serial No. 17,523.

This invention relates to headlights and particularly to headlights for automobiles.

Motorists driving under present conditions are confronted with two separate and distinct problems in illumination, the first when driving on city streets and the second when driving on country roads. A city is usually provided with streets which are at least reasonably well lighted and of fairly regular width. It is, therefore, more necessary that the motorist have a good light thrown immediately ahead so that he can avoid vehicles, street obstructions and observe pedestrians stepping from the curb rather than that the territory a considerable distance ahead be illuminated by his headlights. Due to the heavy traffic on the city streets the most essential thing is that the headlights in general use be of such construction that they be free from glare, i. e. that a minimum of light be thrown in the eyes of approaching drivers and pedestrians. In other words, in the city it is at present most desirable to have a limited area immediately ahead of the car well lighted.

On the other hand, when driving on a country road, the tendency of motorists is to drive at a speed greater than in the city and it is therefore also generally desirable to have a headlight which is adapted to cast a beam over a larger area, especially some distance along the road.

The trouble with the type of headlight most desirable for country road driving is that it blinds the driver of the approaching car, due to its glare or relatively large area of illumination. It is customary to provide automobile headlights either with two filament bulbs or two separate bulbs of different intensity so that the amount of light may be varied in order not to blind the approaching motorist. Many States have laws requiring motorists to dim their lights when approached by another car. This dimming has led to many accidents because the eye of the driver dimming his light cannot readily accommodate itself to the sudden change of light intensity and he is momentarily in the dark. Consequently other States have passed laws forbidding motorists to dim when approached.

We propose to combine in one headlight a plurality of light sources and reflecting surfaces so constructed, arranged, coordinated and controlled that illumination adapted for driving on city streets and illumination adapted for driving on country roads are provided and so that the transition from one specie of illumination to the other will not alter the light intensity over the critical road and ditch area immediately ahead of the car to an extent sufficient to confuse, blind or bewilder the driver.

We propose to accomplish this result by providing an indirect light for city driving in order to illuminate brightly the critical road and ditch area immediately ahead of the car, the light source being substantially hidden and concealed from the front of the headlight. This indirect light is suplemented by an independently controlled direct light adapted to spread the light over a greater area, particularly along the road for some distance ahead of the automobile.

One object of the invention is to provide an automobile headlight adapted to meet present day conditions for driving either on city streets or country roads.

Another object of the invention is to provide a headlight for automobiles with two independently controllable illuminating apparati so constructed, arranged and coordinated that one alone is adequate for city driving, the two together for country driving, and so that dimming the more glaring will not materially vary the intensity of the light over the critical area.

Another object of the invention is to provide a headlight for automobiles comprising an indirect lighting apparatus adapted to intensely illuminate the critical area immediately ahead of the automobile and a separately controllable direct lighting apparatus adapted to illuminate an area greater than that area illuminated by the indirect lighting apparatus.

Other objects and certain advantages will appear in the description of the drawing forming part of this specification, in which:—

Figure 3 is a sectional view taken on line 3—3 of Figure 1.

Figure 4 is a rear view of the reflector.

Figure 1:
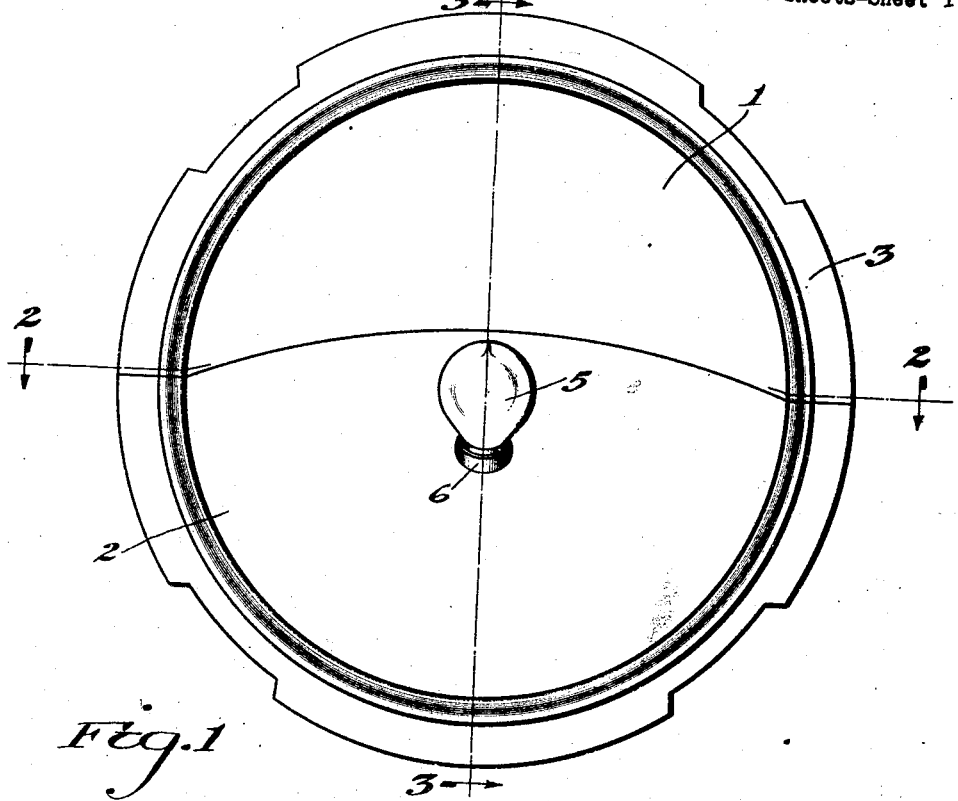
Figure 1 is a front view of the improved reflector.
Figure 2:
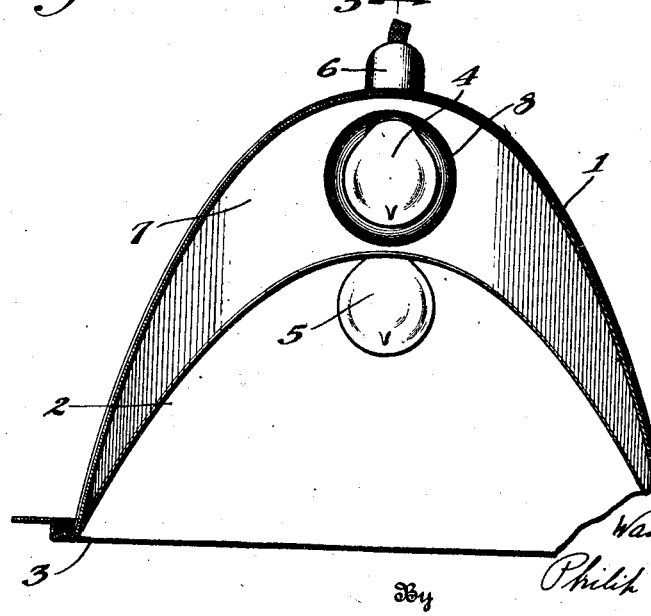
Figure 2 is a sectional view taken on line 2—2 of Figure 1.

Since the subject matter of this invention is primarily adapted for automobile headlights, it will be best understood if described with reference to its preferred use as mounted in service position on an automobile.

The illuminating apparatus comprises two concave reflectors, an upper reflector 1, a lower reflector 2, and two light sources one exposed and one unexposed. These elements are adapted to fit into a conventional headlight casing such as the circular drum type and on that account the reflectors are joined in a substantially circular margin 3 adapted to fit against the front glass. Each reflector comprises substantially one-half of said circular margin. These reflectors preferably are portions of the surfaces generated by the revolution of a curve, such as the ellipse, hyperbola or parabola. These reflectors are of different curvature so that the lower reflector 2 is at the back in advance of the upper reflector 1, thus providing an offset relationship. Behind this forward reflector 2 and screened thereby is a concealed or indirect light source 4, adapted to illuminate the upper reflector 1. A second exposed or direct light source 5 is placed at or about the focal point of the screening or lower reflector 2. Each light source comprises an electric light globe secured in a conventional socket 6. As disclosed a shelf 7 is placed in the offset between the reflectors 1 and 2 and the indirect light source is located in a pocket 8 extending downwardly from the shelf 7.

This pocket 8 may be made of reflecting material or can have a light absorbing finish according to the mount of light desired. If this pocket is made reflective the light thrown on the upper reflector comes from a larger source than the filament of the bulb and, therefore, is spread over an area larger than otherwise.

It is recommended that the shelf 7, if employed, have a light absorbing surface in order to prevent any glare therefrom. The upper reflector 1 is preferably elliptical, the axis of the ellipse passing through the center of the circular margin, and the indirect light source 4 placed at or about the rear focal point. Theoretically, all of the light from the light source is reflected through the second or forward focal point and the focal length is so chosen that the rays will cross at or about this second focal point and produce a light pattern of a size and intensity desirable for the intended condition of usage.

The lower reflector is preferably parabolic and generated on the axis of the elliptical reflector. The exposed light source for this lower reflector is located at about focal point and the parabolic reflector projects the light over a predetermined area.

If desirable hyperbolas may be used to generate one or both reflectors in which case it might be advisable that their respective axes be at an angle one to the other. In fact any curves or combinations of curves may be chosen provided the conic section and the focal lengths are such as to produce the desired light distribution.

As disclosed, each reflector comprises half of the circular margin but in order to completely conceal the light source 4 the middle portion of the lower or screening reflector 2 extends upwardly into the upper hemisphere of the headlight as viewed from the front.

If desirable the proportions may be so chosen that it is unnecessary that this lower reflector 2 extend into the upper hemisphere and each reflector can be made to constitute half of the lamp as viewed from the front.

Thus we provide a headlight which is adapted for driving both on city streets and on country roads. The light from the concealed light source is projected forwardly by the upper reflector to brightly illuminate the critical area immediately ahead of the automobile. The light from the exposed or direct light source is projected by the lower reflector over considerably larger area notable over some distance ahead.

If desirable either reflector may be configurated to increase the light spread to the desired degree. The indirect light is adequate for driving on city streets and under all conditions under which the rate of speed is not extreme or the territory hazardous. The indirect light is sufficient for passing a car on a country road after the supplemental direct light has been turned off or dimmed. This direct light is adequate, together with the indirect light for all speeds and conditions of driving.

Inasmuch as the essence of the invention is not dependent upon transposition of parts, such relative terms as "above" and "below" or "upper" and "lower" are to be understood solely in relation to the necessary description of the particular embodiment illustrated in the drawings for the purpose of disclosing the principles of the invention.

Having described our invention, we claim:—

1. A headlight comprising two concave reflectors joined at the front in a circular margin, said reflectors generated on the same axis of revolution but of different curvatures to provide an offset between them at the rear, the reflector of shorter curvature being parabolic and substantially below the axis of the headlight and the reflector of longer curvature elliptical and above the axis of the headlight with its rearward focal point between the two reflectors, and two light sources one at the focal point of the parabolic reflector and the other at the rearward focal point of the elliptical reflector and screened from view by the rear portion of the parabolic reflector.

2. A head lamp for automobiles comprising a concave body formed by two reflectors each having a substantially semi-circular rim, said rims joined together into a continuous circular margin, the first reflector extending behind the second reflector at the rear to provide an offset between them, a light source between said two reflectors screened by the second reflector as viewed from the front, the first reflector curved with relation to said source to project the light emanating from said source over the area immediately ahead of the car, said second reflector having light focalizing curvature and a second light source at or about the focal point of said second reflector, said second reflector and source disposed to cast a beam of light over an area at a greater distance ahead than the area illuminated by the first reflector and light source.

In witness whereof, we hereunto subscribe our names.

WADE CUSHING.
PHILIP W. KENDALL.